(No Model.) 2 Sheets—Sheet 2.

A. M. RYMER-JONES.
GRADE RECORDING INSTRUMENT.

No. 254,982. Patented Mar. 14, 1882.

Witnesses:

Inventor:
Alexander M. Rymer-Jones
by John J. Halsted
his Atty.

N. PETERS, Photo-Lithographer, Washington, D. C.

UNITED STATES PATENT OFFICE.

ALEXANDER MANSON RYMER-JONES, OF LONDON, ENGLAND.

GRADE-RECORDING INSTRUMENT.

SPECIFICATION forming part of Letters Patent No. 254,982, dated March 14, 1882.

Application filed August 22, 1881. (No model.) Patented in England November 21, 1879.

*To all whom it may concern:*

Be it known that I, ALEXANDER MANSON RYMER-JONES, a subject of the Queen of Great Britain, residing at 22 Castletown Road, West Kensington, London, England, have invented a recording and registering level for making sections for railway and other surveys that show differences of level, (for which I have obtained a patent in Great Britain, No. 4,739, bearing date 21st November, 1879,) of which the following is a specification.

This invention of a recording and registering level for making sections for railways and other surveys that show differences of level is intended to dispense with the recording of levels by the surveyor in the ordinary method, as well as the subsequent plotting from the field-book, the machine itself recording the differences of level and plotting them down upon a continuous roll of paper.

Figure 1:
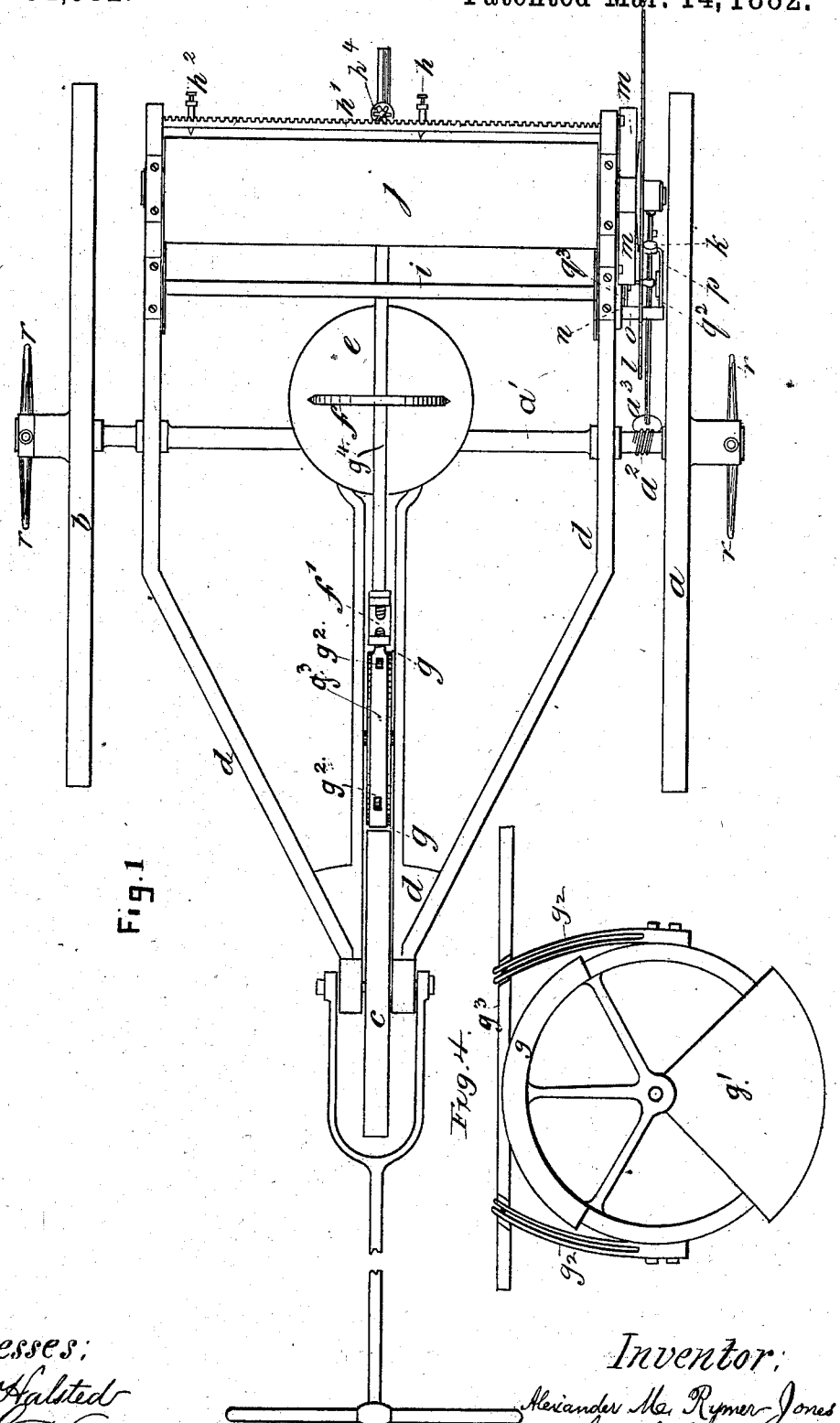
Figures 2, 3:
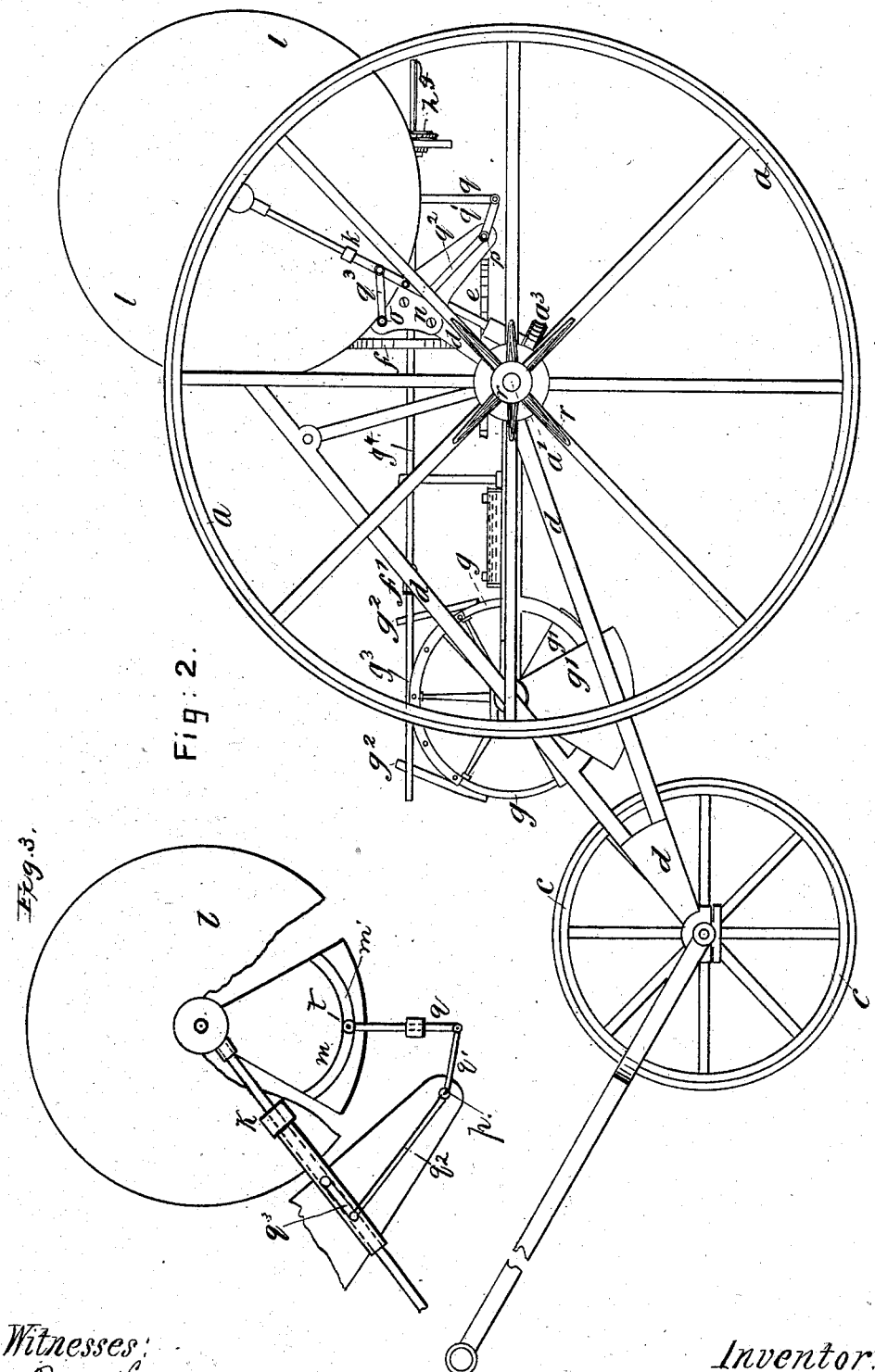

Figure 1 is a plan view, Fig. 2 an elevation, of an apparatus embodying and serving to illustrate my invention; and Figs. 3 and 4 details.

The instrument is composed of a wheel or prime mover, $a$, of any convenient diameter, which is propelled or guided over the track to be surveyed. In connection with this wheel is another of the same size, $b$, which might, if preferred, be the prime mover, or both may be employed and a small wheel or wheels, $c$, connected by suitable framing, $d$, forming the body of the instrument or carriage or framing for holding the several parts required. Turning with the first wheel named, and upon its axle $a'$, is a small vertical pinion or worm-screw, which drives another horizontal wheel or pinion, carrying on its axis a horizontal surface-plate or wheel, $e$. Upon this surface-wheel is carried a vertical wheel, $f$, capable of traversing from the center of the surface-wheel to its periphery. It is evident that this vertical wheel, resting on the center of the surface-wheel, will in such position have no movement of rotation, but if moved from the center toward the periphery will have motion imparted to it, and that such motion will be increased as the vertical wheel or level-motor is taken farther from the center of the surface-wheel, according to the direction or influence of an eccentric or curved horns or cams governed by that wheel.

In connection with the axle of the vertical wheel or level-motor $f$ is an adjustable swivel, $f'$, which may be adjusted as required, and which, by means of the slide rod or bar $g^4$ and the rod $g^3$, with both of which it is connected, forms the junction with the edge of the vertically-suspended wheel $g$, this junction being effected by the two curved horns $g^2 g^2$. When the wheel $g$ swings or oscillates these horns shift the rod $g^3$, and consequently the bar $g^4$, and thereby move the level-motor $f$ to or from the center of the surface-wheel $e$. The suspended wheel $g$ is heavily weighted in one or more of its segments, $g'$, so as always to remain in one vertical position relative to the horizontal level. If the weighted wheel $g$ be moved to the right or left, the slide-rod $g^4$, which carries the frictional roller in the center of the machine, is by means of the horns $g^2 g^2$ moved backward or forward, in order to enable the machinery of which it is a part to mark the rise or fall of the ground. It follows, therefore, that any change of level in the carriage will correspondingly affect the position of the level-motor $f$, carrying or shifting it either to one side or to the other of the center of the surface-wheel $e$, which will then revolve with a greater or less velocity as it is more or less distant from the center governed by the eccentric. Connected by axles and pinions, this shifting motion is transmitted to a pencil, $h$, held on the rack-wand $h'$. The rack-wand receives its motion from a system of gearing (shown at $h^4 h^5$) deriving its motion from the motor $f$, and consequently the wand $h'$ will carry the pencil horizontally right and left of the medial line of the machine as the angle is up or down during the travel of the instrument, and so that it may act upon a sheet of paper coiled upon a bobbin-roller, $i$, and which, passing over a curved or other surface or cylinder, $j$, is received upon another bobbin-roller similar to and placed above or below the bobbin-roller $i$. The sheet of paper of any convenient width may be plain or graduated, and the speed of the paper can be adjusted to any ratio with the speed of the prime mover.

It is evident from this description that so long as the machine is rolling over a perfectly-level surface the pencil will describe a single plain line parallel and continuous with the length of the roll, but that any movement arising from the ascent of the carriage or the descent will cause the pencil to deviate from such parallel course, and will register itself on either side of such single plain line as the machine is either ascending or descending. The datum-line is given by a fixed pencil, $h^2$, which can be adjusted or fixed at the commencement of the survey at such a distance from the medial line as may be desired. It will, however, be necessary to compensate for the greater length of course described by the prime mover in traversing the hypotenuse of the base when ascending or descending from the level, and this is accomplished in the following manner: The cylinders of paper are connected and put in motion by a pinion on the prime mover, and axles and gearing so adjusted as to give the desired ratio of travel to the paper from the action of the prime mover, according to the scale required, so long as the machine is traveling over a uniformly plane or level surface, and the adjustment for compensating the greater length of the hypotenuse is accomplished by giving to the cylinders, or one of them, over which the paper passes a variable diameter. This is given by making the circumference of the compensating cylinder or cylinders of a coiled sheet of flexible steel or other metal, to be distended by radial arms jointed to a collar free to play upon the axle of the paper-cylinder or compensating-cylinder, the outer ends of the radial arms carrying friction wheels or rollers. It is obvious that any movement of rotation in either direction given to this collar will contract the outer circumference formed by the ends of the friction-rollers, and the coiled flexible sheet of steel will by its inherent resilience act in unison with it. Any cylinder capable of being expanded and contracted so as to vary its circumference as required will answer the purpose; but the mere placing on the radial arms or frame of the cylinder of a rolled or coiled sheet of flexible metal, so that this sheet shall encircle such circular frame, and by reason of its flexibility and inherent resilience be adapted to be expanded by it and to contract as the arms are drawn inward toward the center of the cylinder, will afford an expansible cylinder suitable for the end in view. This adjusting motion is caused by the wheels, portions of wheels, or radial arms attached to the collar or collars and weighted in their segments or arms by weights, as in the suspended wheel described. The normal position of the cylinder will then be the full distention of the radial arms, and the contraction of the cylinder will take place whenever the machine is either ascending or descending from the normal level, and thus compensate for the greater length of the course of the prime mover.

In the drawings a plan is shown by which the motion of the paper is regulated by the acceleration or retardation of the speed of the bobbins and cylinders. This is accomplished by a frictional motion derived from the prime-mover axle $a'$, worm-wheel $a^2$, and worm-pinion $a^3$, but by which a friction-pinion, $k$, drives a vertical friction-plate, $l$, the friction-pinion $k$ being by the action of the weight $m$ drawn nearer to or farther from the center of the friction-plate $l$, according to eccentric or cam governed by the weight $m$. The friction-plate $l$, being keyed on the axle of the cylinder $j$, and imparting motion to it, carries the paper in exact unison with the requirements of the angles of the grades, be they greater or less. For clearness of description one journal-supporting bracket is omitted on the plan, but its position will be evident to any mechanic.

Behind the disk or friction-plate $l$, (see Figs. 1 and 3,) which is keyed to the cylinder $j$, which carries the drawing-paper, is a weight, $m$, working loosely on the axle of the cylinder $j$. In this weight is a slotted groove, $m'$, in which is a roll or wheel, $t$, attached to the rod $q$. If the weight $m$ be moved to the right or left, the effect will be to raise the rod $q$, and thus through the system of levers $q\,q'\,q^2\,q^3$, of which it is a part, to draw the roller $k$ nearer to the circumference of the disk $l$, thus necessitating a greater number of revolutions of the roller $k$ and of the wheels on which the machine moves to make one revolution of the disk $l$. This takes place when the machine is traveling up or down hill, and compensates for the difference between the hypotenusal and horizontal distances.

The bracket end, in connection with the frame $d$, is for the purpose of supporting the two points $o\,p$ of the system of levers $q\,q'\,q^2\,q^3$, which adjust the length of the axle of the friction-pinion $k$, as is evidently necessary from the description.

In cases where the machine is wished to be out of gear to make a detour, or to travel from point to point, or in traveling round a curve, one or both wheels may be thrown out of gear with the level-recording-paper or level-motor. Although the machine herein described is fitted with three wheels, the principle and the mechanism can be adjusted to be moved on two or four wheels.

Having now described and particularly set forth my invention and the manner of carrying the same into effect, I would have it understood that what I claim is—

1. A self recording and registering level for making sections for railway and other surveys in which the operating devices for recording are actuated primarily from a suspended and weighted wheel hung on a pivoted framing, $d$, and provided with horns or arms for giving motion to a sliding rod, substantially as shown and described.

2. In a recording and registering level for the purpose set forth, the combination of the following devices: a carriage, one of whose wheels is a prime motor, the wheel $c$, framing $d$, axle $a'$, worm-wheel $a^2$, pinions $a^3$ and $k$, friction-plate $l$, weight $m$, and its described connections, surface-wheel $e$, and level-motor $f$, the combination operating substantially as set forth.

3. In combination, the suspended and weighted wheel $g$ and its curved horns, the vertical wheel or level-motor connected with such wheel, and the horizontal friction-plate, substantially as and for the purpose set forth.

4. In combination, the vertical friction-plate $l$, the friction-pinion $k$, and its system of levers $q\ q'\ q^2\ q^3$, and the grooved weight $m\ m'$, for adjusting the speed of the paper to receive the tracings of the level, substantially as set forth.

A. M. RYMER-JONES.

Witnesses:
WM. MORGAN BROWN,
R. H. PHILLIPS,
*Both of 38 Southampton Buildings, Chancery Lane, London, W. C.*